No. 619,659. Patented Feb. 14, 1899.
J. W. BENNETTO.
TRIPOD STAND.
(Application filed Jan. 21, 1898.)
(No Model.)
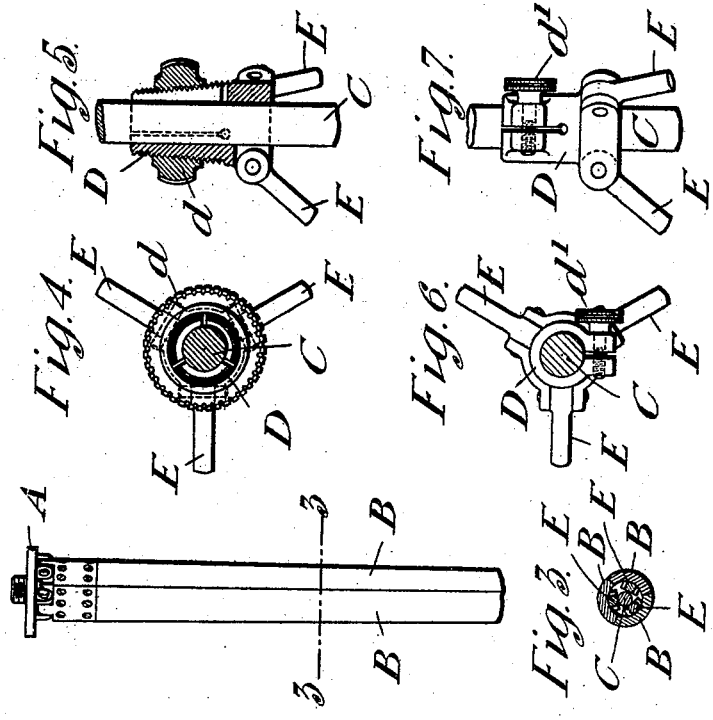
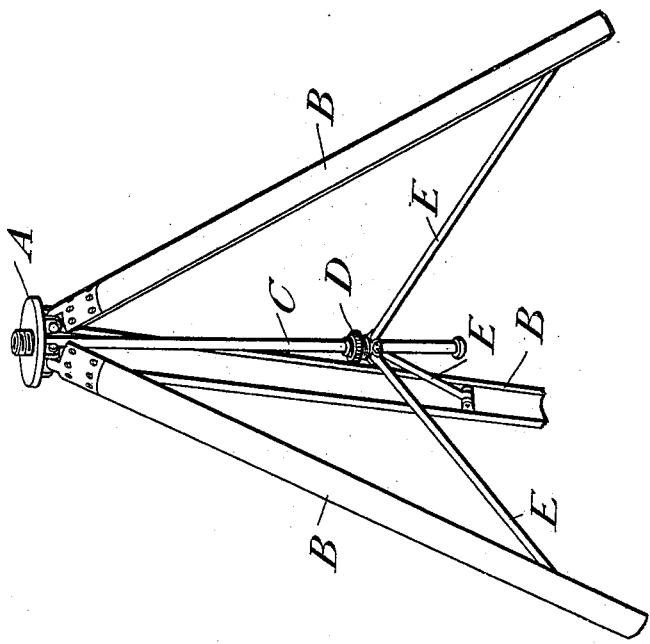
Witnesses
Inventor
John W. Bennetto
James L. Norris
Atty

UNITED STATES PATENT OFFICE.

JOHN WALLACE BENNETTO, OF NEWQUAY, ENGLAND.

TRIPOD-STAND.

SPECIFICATION forming part of Letters Patent No. 619,659, dated February 14, 1899.

Application filed January 21, 1898. Serial No. 667,417. (No model.)

*To all whom it may concern:*

Be it known that I, JOHN WALLACE BENNETTO, a citizen of England, residing at The Studio, Newquay, in the county of Cornwall, England, have invented a certain new and useful Improvement in Tripod-Stands, of which the following is a specification.

My invention relates to the construction of a tripod-stand for a camera or surveying or other instrument in such a manner that its legs are held steadily at any desired spread, as I shall describe with reference to the accompanying drawings.

Figure 1 is a perspective view of a tripod-stand according to my invention. Fig. 2 is an elevation, and Fig. 3 is a sectional plan on the line 3 3 of Fig. 2, showing the legs closed together. Fig. 4 is a plan, and Fig. 5 is a section, of a clamp for the stretchers. Fig. 6 is a plan, and Fig. 7 an elevation, of a modified form of the clamp.

To the head A of the tripod, which has three legs B hinged to it in any usual way, is attached a central vertical rod C, along which a clamping-sleeve D is fitted to slide. To this sleeve are jointed the ends of three stretchers E, the other ends of which are jointed to the legs B.

According as the sleeve D is slid higher or lower along the rod C the legs B are spread to a less or greater width. In order to secure them at any spread, the sleeve D is made so that it can be clamped by a screw at any part of the rod C. For this purpose a known construction, such as that shown by Figs. 4 and 5, may be adopted.

The sleeve is made somewhat tapering and screw-threaded and has three splits along its threaded part, and on it is screwed a nut $d$, by which the split part is compressed on the rod.

Another known form of clamp is shown by Figs. 6 and 7. In this case the sleeve is split along one side and has two projecting flanges, which can be pressed together by a screw $d'$. Obviously other known forms of clamps might be employed or the sleeve could be held by a setting-screw passing through it, with its end bearing against the rod C.

Although I have shown the head of the tripod comparatively small and the legs of considerable strength adapted for a surveying instrument, obviously when the tripod is to be used for supporting a camera the head may be larger and the legs may be split.

As most clearly shown in Fig. 1 of the drawings, the legs B are grooved longitudinally or hollowed out on their inner sides and the rod C and stretchers E are of small diameter compared to said legs, whereby when the legs are folded up they come closely and compactly together, as clearly shown in Fig. 2, the rod and stretchers lying in said grooves or hollowed-out portions of the legs, whereby the tripod may be folded into a very small compass.

Having thus described the nature of this invention and the best means I know of carrying the same into practical effect, I claim—

In a tripod, the combination with the head, of the legs hinged thereto at their upper ends and longitudinally grooved or hollowed out on their inner sides, a central, vertical rod attached to the head, a sleeve adapted to slide on said rod, means for clamping said sleeve at adjusted positions on said rod, and stretchers jointed to the sleeve and to the legs, said stretchers and rod, when the legs are folded up, being inclosed and lying in the grooved or hollowed-out portions of the legs, substantially as described.

In testimony whereof I have signed my name to this specification, in the presence of two subscribing witnesses, this 17th day of December, A. D. 1897.

JOHN WALLACE BENNETTO.

Witnesses:
JAS. W. GRAHAM,
SIMON SIMCOTT.